Dec. 15, 1925.  
H. W. MELLING  
1,565,948  
MILLING MACHINE  
Filed Feb. 4, 1924  
5 Sheets-Sheet 1
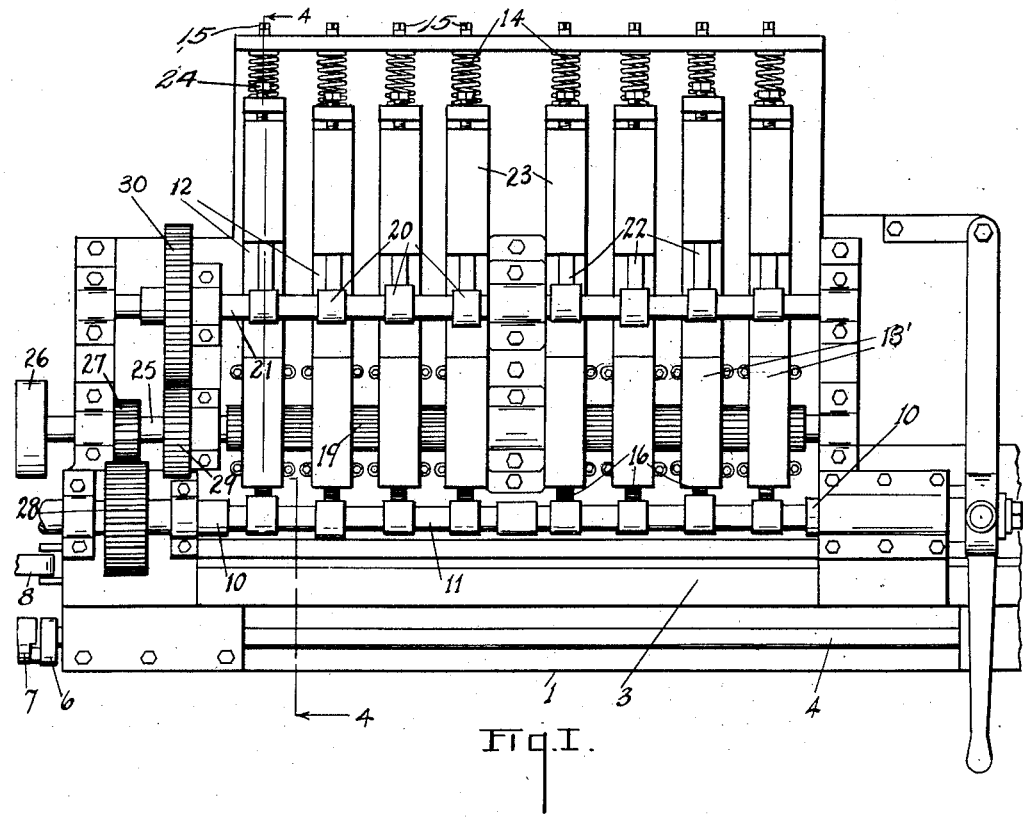
Fig. I.
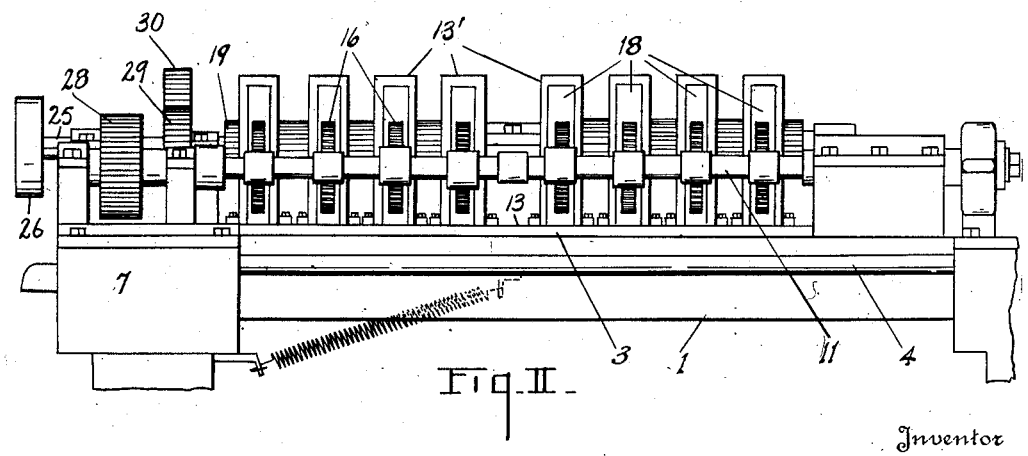
Fig. II.
Inventor  
Herman W. Melling  
By Chappell Earl  
Attorneys Dec. 15, 1925.
H. W. MELLING
1,565,948
MILLING MACHINE
Filed Feb. 4, 1924   5 Sheets-Sheet 2
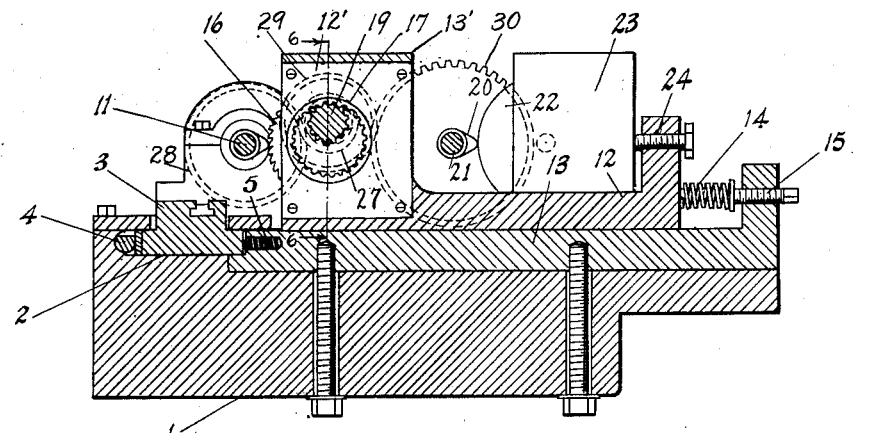
Fig. IV.
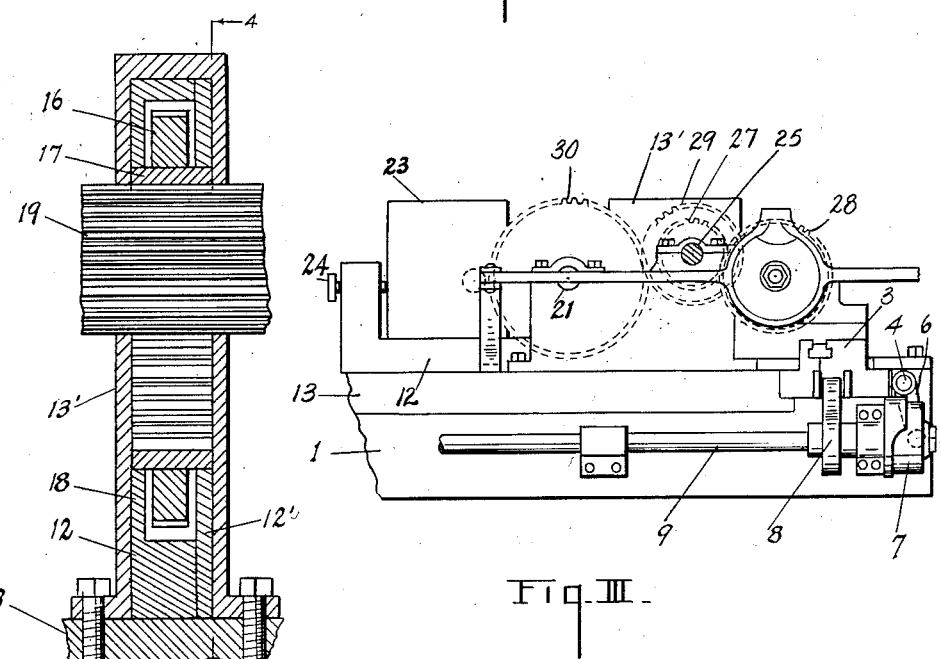
Fig. III.
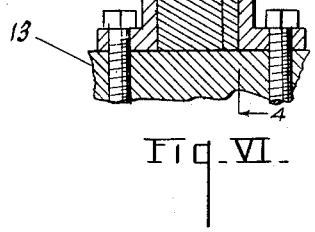
Fig. VI.
Inventor
Herman W. Melling
By Chappell & Earl
Attorneys

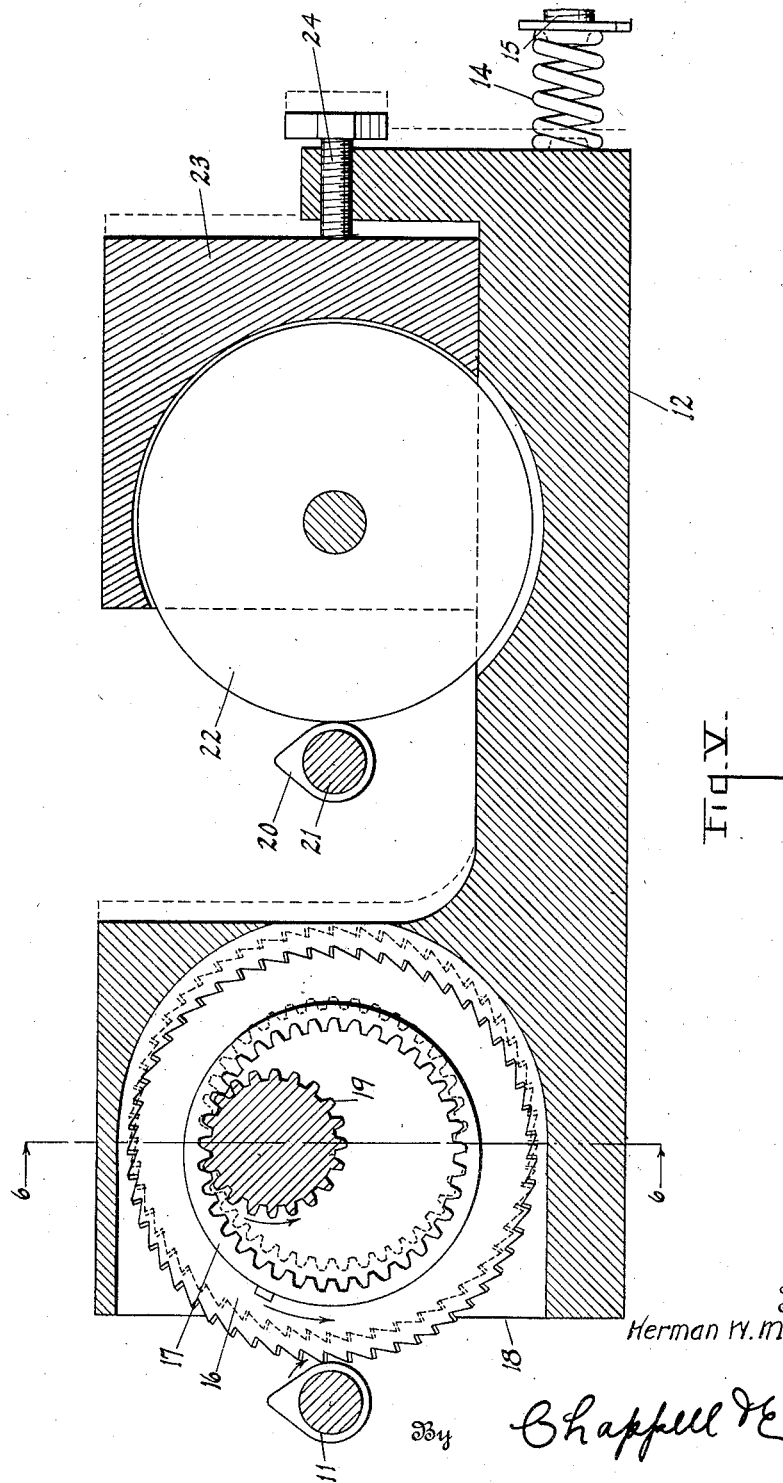

Dec. 15, 1925.
H. W. MELLING
MILLING MACHINE
Filed Feb. 4, 1924
1,565,948
5 Sheets-Sheet 4
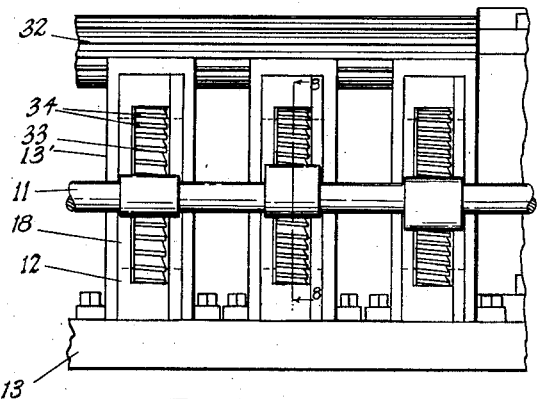
Fig. VII.
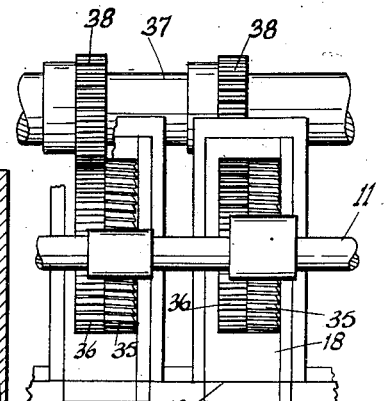
Fig. IX.
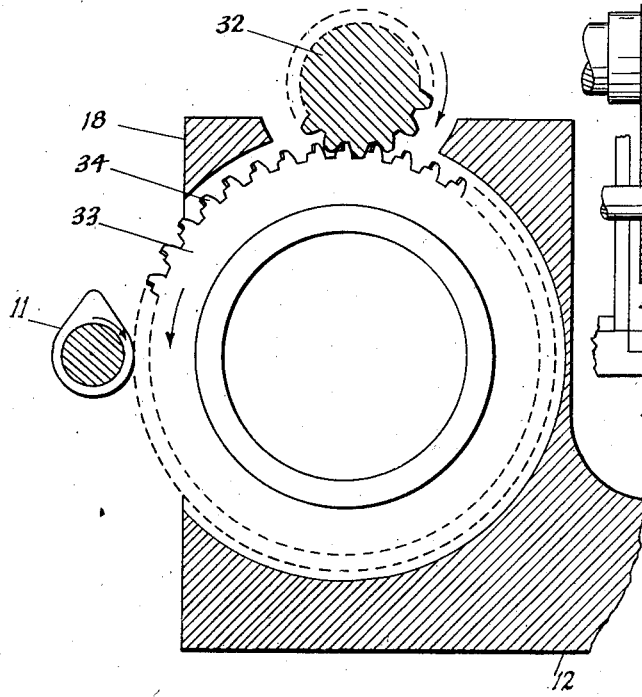
Fig. VIII.
Inventor
Herman W. Melling
By Chappell & Earl
Attorneys Dec. 15, 1925.  H. W. MELLING  1,565,948
MILLING MACHINE
Filed Feb. 4, 1924   5 Sheets-Sheet 5
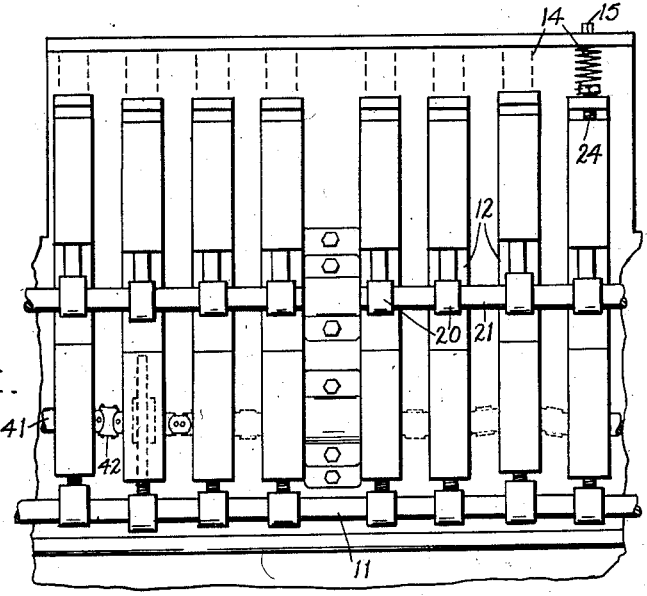
Fig. X.
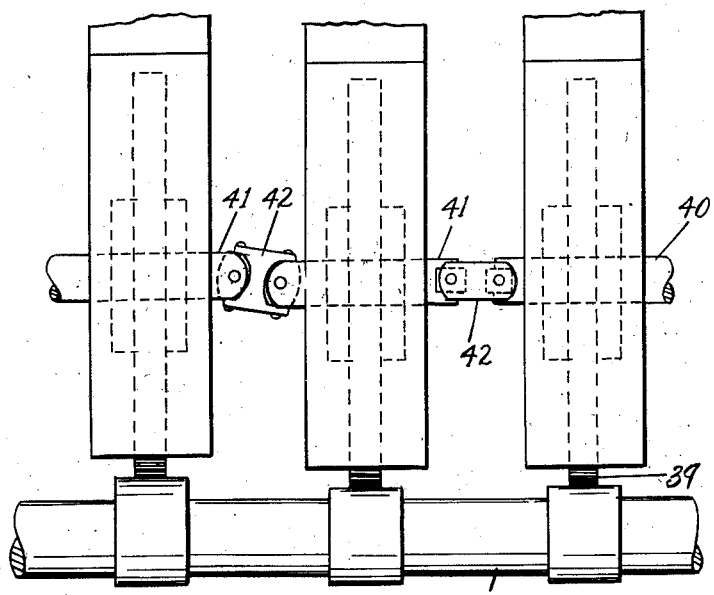
Fig. XI.
Inventor
Herman W. Melling
By Chappell Earl
Attorneys Patented Dec. 15, 1925.

1,565,948

UNITED STATES PATENT OFFICE.

HERMAN W. MELLING, OF JACKSON, MICHIGAN.

MILLING MACHINE.

Application filed February 4, 1924. Serial No. 690,500.

*To all whom it may concern:*

Be it known that I, HERMAN W. MELLING, a citizen of the United States, residing at the city and county of Jackson, State of Michigan, have invented certain new and useful Improvements in Milling Machines, of which the following is a specification.

This invention relates to improvements in milling machines.

The main objects of this invention are:

First, to provide an improved milling machine for the manufacture of cam shafts and the like.

Second, to provide an improved milling machine of the class described which is of large capacity and produces a very uniform product.

Third, to provide an improved machine of the class described which is simple and economical in structure and very durable.

Objects pertaining to details and economies of construction and operation of my improvements will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I is a fragmentary plan view of a milling machine embodying the features of my invention, parts being shown conventionally for convenience in illustration.

Fig. II is a fragmentary front elevation of the machine shown in Fig. I.

Fig. III is a fragmentary end elevation looking from the left of Figs. I and II.

Fig. IV is a vertical transverse section on a line corresponding to line 4—4 of Figs. I and VI.

Fig. V is an enlarged detail longitudinal section through one of the cutter units.

Fig. VI is an enlarged detail vertical section on a line corresponding to line 6—6 of Figs. IV and V.

Fig. VII is a front elevation of a modified form or embodiment of my invention, the modification being in the driving means for the cutters.

Fig. VIII is a detail section on a line corresponding to line 8—8 of Fig. VII.

Fig. IX is a fragmentary front elevation of another modification in the matter of cutter drive.

Fig. X is a fragmentary plan view of still another modification in the cutter drive.

Fig. XI is an enlarged fragmentary view of the embodiment shown in Fig. X.

In the drawing the sectional views are taken looking in the direction of the little arrows at the ends of the section lines and similar numerals of reference indicate similar parts throughout the several views.

Referring to the drawing, the bed 1 is provided with a suitable way 2 for the work carriage 3. This work carriage is mounted on the way 2 for longitudinal feeding movement and for lateral movement to adjust the depth of the cut, the lateral movement being effected by the cam shaft 4 which acts to adjustably support the table. The coiled springs 5 support the table against the cam (see Fig. IV).

In practice this table adjustment may be automatically effected for a roughing cut and a finishing cut, if desired, the cam shaft 4 having an arm 6 coacting with the cam 7 (see Figs. I and III). The carriage feed movement is controlled by the cam 8 on the shaft 9.

The work carriage is provided with chucks shown conventionally at 10 for rotatably supporting the work 11, the work here shown being a cam shaft of an internal combustion engine.

I provide a plurality of tool carriages 12 which are mounted on the way 13 for horizontal sliding movement laterally of the work, the carriages being independently movable and advanced or urged to the work by the coiled springs 14 provided with tension adjusting members 15. The carriages are guided and supported by the housings 13'.

In the embodiment shown in Figs. I–VII, inclusive, the annular cutters 16 are provided with internal gears 17, the ends of the gears projecting at each end to form hubs as shown in Fig. VI, these hubs being mounted in the bearings 18 provided therefor in the front ends of the carriages (see Figs. V and VI). The carriages are provided with removable side portions 12' to facilitate assembling of the cutters thereon.

The elongated driving gear or toothed driving shaft 19 is arranged through the series of internal cutter gears to coact therewith as shown in Figs. V and VI, the diameter and mesh of the internal cutter gears being such as to permit the reciprocating movement of the carriage as indicated by dotted lines in Fig. V.

The carriage control cams 20 are mounted upon the cam shaft 21, there being a control or master cam 20 for each carriage. These control or master cams correspond to the cams or work to be cut, the carriage control cams illustrated being replicas of the finished work. This permits the use of a finished cam shaft as a pattern or master cam and the finished work is an exact duplicate or replica of the master cam. There are numerous advantages in this in that it avoids the necessity of timing and adjusting the carriage control cams on the shaft and the making of the cams, it only being necessary, as stated, to introduce a complete or finished cam shaft which it is desired to reproduce.

The work, as ordinarily introduced, is a forging, the work illustrated corresponding to the finished work but it will be understood that in practice there is more or less irregularity as the work is introduced and more or less stock to be removed.

The carriage is provided with an abutment 22 which is preferably a roller as that reduces friction and wear between the abutment and the carriage control cam. This abutment is the same diameter as the cutter so that the point of contact of the cam 20 with the abutment will correspond to the point of contact of the cutter with the work, thereby enabling reproduction of the pattern cam. The abutment roller is carried by the support 23 which is adjusted upon the carriage by means of the screw 24. The work 11 and the carriage control shaft 21 are driven in synchronism.

In the structure illustrated the elongated gear 19 is mounted upon a shaft 25 having a pulley 26 connected to a suitable source of power. The shaft 25 is provided with a gear 27 meshing with a gear 28 on the live work spindle. The shaft 25 is provided with a second gear 29 meshing with the gear 30 on the control cam shaft 21. The gears 27 and 28, and 29 and 30 are so proportioned that the work 11 and the cam shaft 21 are driven at the same speeds.

In the modification shown in Figs. VII and VIII the driving shaft 32 is arranged above the cutters 33 which are provided with blades 34 adapted also as gear teeth, thus providing an external peripheral gear for the cutters.

In the embodiment shown in Fig. IX the cutters 35 have external gears 36 secured to the side thereof, the driving shaft 37 having gears 38 thereon coacting with gears 36.

In the modification shown in Figs. X and XI the cutters 39 are driven through a flexible shaft 40 consisting of sections 41 to which the gears are secured, and double universal joints 42 connecting these sections 41. These universal joints are shown conventionally, the particular form of universal joint forming no part of this invention.

The driving gearing illustrated for these embodiments shown in Figs. I–VI, inclusive, would be satisfactory for these modified embodiments or adaptations of my improvements, and, therefore, I have not shown such gearing in connection therewith.

My improved machine is of large capacity and produces very accurate and uniform work. It has the further advantage of being very compact, economical in structure, and very durable.

I have not attempted to illustrate other embodiments which I contemplate as I believe the disclosure made will enable those skilled in the art to which my invention relates to embody or adapt the same as may be desired.

Having thus described my invention what I claim as new and desire to secure by Letters Patent is:

1. In a machine for milling cam shafts, the combination of a work carriage, a plurality of cutter carriages independently movable laterally of said work carriage, annular cutters provided with internal gears carried by said cutter carriages, a driving gear disposed through said cutters to coact with their said internal gears, said internal gears being of such diameter and mesh as to permit reciprocating movement of the carriages, a shaft provided with a plurality of master cams corresponding to the shape of the cams to be cut, abutment rollers of a diameter corresponding to the diameter of the cutters mounted on said cutter carriages to coact with said master cams, and means for driving the work and the master cam shaft at the same speed.

2. In a machine for milling cam shafts, the combination of a work carriage, a plurality of cutter carriages independently movable laterally of said work carriage, annular cutters provided with internal gears carried by said cutter carriages, a driving gear disposed through said cutters to coact with their said internal gears, said internal gears being of such diameter and mesh as to permit reciprocating movement of the carriages, a shaft provided with a plurality of carriage control cams corresponding to the shape of the work to be cut, and means for driving the work and the control cam shaft at the same speed.

3. In a machine for milling cam shafts, the combination of a work carriage, a feed means for said work carriage, a plurality of cutter carriages independently movable laterally of said work carriage, milling cutters carried by said cutter carriages, means for driving said cutters permitting the reciprocating movement of the carriages, a shaft provided with a plurality of master cams of the shape of the cams to be cut, abutment rollers of the diameter of the cutters adjustably mounted on said cutter carriages to coact with said master cams, and means for driving the work and the master cam shaft at the same speed.

4. In a machine for milling cam shafts, the combination of a work carriage, a feed means for said work carriage, a plurality of cutter carriages independently movable laterally of said work carriage, a milling cutter carried by said cutter carriages, means for driving said cutters permitting the reciprocating movement of the carriages, a shaft provided with a plurality of carriage control cams which are replicas of the cams to be cut, abutment rollers on said carriages with which said control cams coact, said abutment rollers being of the diameter of the cutters, and means for driving the work and the master cam shaft at the same speed.

5. In a machine for milling cam shafts, the combination of a work carriage, a feed means for said work carriage, a plurality of cutter carriages independently movable laterally of said work carriage, milling cutters carried by said cutter carriages, driving means common to the several milling cutters permitting the reciprocating movement of the carriages, a shaft provided with a plurality of carriage control cams which are replicas of the cams to be cut, abutment rollers on said carriages with which said control cams coact, said abutment rollers being of the diameter of the cutters, and means for driving the work and the said control cam shaft at the same speed.

6. In a structure of the class described, the combination of a plurality of cutter carriages mounted for reciprocating movement, cutters rotatably mounted on said carriages, a common driving means for said cutters, a carriage control cam for each of said carriages which are replicas of the cams to be cut, abutment rollers on said carriages with which said control cams coact, said abutment rollers being of the diameter of the cutters, and a common driving means for said carriage control cams.

7. In a structure of the class described, the combination of means for rotatably supporting the work, a cutter carriage reciprocating transversely of the work, an annular cutter provided with an internal gear carried by said cutter carriage, a driving gear disposed within said cutter gear to coact with its said internal gear, the internal gear being of such diameter and mesh as to permit reciprocating movement of the carriage, and means for controlling the reciprocating movement of said carriage and driving the work in synchronism.

8. In a structure of the class described, the combination of means for rotatably supporting the work, a cutter carriage reciprocating transversely of the work, an annular cutter provided with an internal gear carried by said cutter carriage, a driving gear disposed within said cutter gear to coact with its said internal gear, the internal gear being of such diameter and mesh as to permit reciprocating movement of the carriage, a master cam of a shape corresponding to the shape of the work, an abutment roller of a diameter corresponding to the cutter mounted on said carriage to coact with the master cam, and means for driving the work and master cam at the same speed.

9. In a structure of the class described, the combination of means for rotatably supporting the work, a cutter carriage reciprocating transversely of the work, an annular cutter provided with an internal gear carried by said cutter carriage, a driving gear disposed within said cutter gear to coact with its said internal gear, the internal gear being of such a diameter and mesh as to permit reciprocating movement of the carriage, a carriage control cam of a shape corresponding to the shape of the work, and means for driving the work and master cam at the same speed.

10. In a structure of the class described, the combination of a work carriage, a feed means for said work carriage, a cutter carriage, a milling cutter mounted on said cutter carriage, means for driving said milling cutter permitting the reciprocation of the cutter carriage, a master cam of the shape of the work to be cut for controlling said cutter carriage, an abutment on said cutter carriage having a curved face coacting with said master cam, the radius of said face corresponding to the radius of the cutter, said master cam and abutment being associated so that the feeding movement of the carriage is limited by the master cam, a spring acting to hold the cutter to the work, and means for driving the work and master cam in synchronism.

11. In a structure of the class described, the combination of means for rotatably supporting the work, a cutter carriage reciprocating laterally of the work, a cutter rotatably mounted on said cutter carriage, means for driving said cutter permitting reciprocating movement of the carriage, a master cam of the shape of the work to be cut for controlling the carriage, an abutment roller on said carriage coacting with said master cam, the diameter of said roller corresponding to the diameter of the cutter, the plane of the reciprocation of said carriage being parallel to a plane through the axis of the work, cutter and master cam, and means for driving said master cam and the work at the same speed.

12. In a structure of the class described, the combination of means for rotatably supporting the work, a cutter carriage reciprocating laterally of the work, a cutter rotatably mounted on said carriage, means for driving said cutter permitting the reciprocating movement of the carriage, a master cam of the shape of the work to be cut, an abutment on said carriage coacting with said master cam and having a curved face of a radius corresponding to the radius of the cutter, the carriage reciprocating in a plane parallel to a plane through the axis of the work, cutter and master cam, and means for driving said master cam and the work in synchronism.

13. In a structure of the class described, the combination of a work carriage, a feed means for said work carriage, a cutter carriage, a milling cutter mounted on said cutter carriage, means for driving said milling cutter permitting the reciprocation of the cutter carriage, a carriage control cam which is a replica of the work to be cut for controlling said cutter carriage, abutment rollers on said carriages with which said control cams coact, said abutment rollers being of the diameter of the cutters, and means for driving the work and carriage control cam in synchronism.

14. In a structure of the class described, the combination of a reciprocating cutter carriage, a cutter rotatably mounted on said cutter carriage, a master cam corresponding to the shape of the work to be cut, the carriage reciprocating in a plane parallel to a plane through the axis of the work, cutter and master cam, an abutment on said carriage coacting with said cam to control the carriage, and a spring arranged to advance said carriage, said master cam and abutment being arranged so that the forward movement of the carriage is controlled thereby.

15. In a structure of the class described, the combination of means for rotatably supporting the work, a cutter carriage reciprocating laterally of the work, the carriage reciprocating in a plane parallel to a plane through the axis of the work, cutter and master cam, a milling cutter mounted on said cutter carriage, means for driving said milling cutter permitting reciprocation of the cutter carriage, a carriage control cam of the shape of the work to be cut for controlling said cutter carriage, and means for driving said work and carriage control cam in synchronism.

In witness whereof, I have hereunto set my hand.

HERMAN W. MELLING.